United States Patent

[11] 3,624,042

[72] Inventors Hyman R. Lubowitz
Pasadena;
Charles Kuchar, Glendora; Harold L. Greenberg, West Covina; Raymond M. Price, Glendora, all of Calif.
[21] Appl. No. 505,080
[22] Filed Aug. 18, 1965
[45] Patented Nov. 30, 1971
[73] Assignee Aerojet-General Corporation
Azusa, Calif.
Original application Nov. 29, 1962, Ser. No. 241,058. Divided and this application Aug. 18, 1965, Ser. No. 505,080

[54] CARBOXY TERMINATED POLYMER AND CURED DERIVATIVE THEREOF
10 Claims, No Drawings

[52] U.S. Cl.................................................. 260/75 N,
149/19, 260/40 R, 260/75 P, 260/75 H, 260/78 R, 260/78 TF, 260/78.4 R, 260/475 P
[51] Int. Cl........................................................ C08g
17/14, C07c 69/80
[50] Field of Search............................................. 149/19;
260/75 H, 40 R, 860, 75 P, 75 N, 75 A, 475 P, 78 R, 78 TF, 78.4 R

[56] References Cited
UNITED STATES PATENTS

| | | | |
|---|---|---|---|
| 3,523,808 | 8/1970 | Gold et al. | 149/88 |
| 3,155,552 | 11/1964 | Vriesen | 149/19 |
| 3,177,101 | 4/1965 | Vriesen | 149/19 |
| 3,232,801 | 2/1966 | Bost et al. | 149/19 |

*Primary Examiner*—Leland A. Sebastian
*Attorneys*—D. Gordon Angus and Edward O. Ansell CLAIM 5: A cured rubber composition comprising the reaction product of a liquid carboxy-terminated polymeric adduct having the generic formula

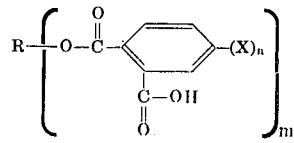

wherein X is a halogen, $n$ is an integer of from 1 to 4, $m$ is an integer of from 2 to 3; wherein when $m$ has a value of 2, R is a polymeric divalent organic radical selected from those having the formula

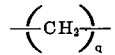

wherein $q$ is an integer having a value from about 60 to about 600,

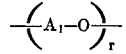

wherein $A_1$ is a lower alkylene radical and $r$ is an integer having a value from 20 to about 200; and

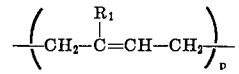

wherein $R_1$ is selected from the group consisting of hydrogen and methyl and $p$ is an integer having a value of from about 12 to about 120; and wherein when $m$ is 3, R is a trivalent radical of the formula

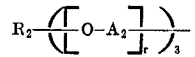

wherein $A_2$ is a lower alkylene radical, $r$ is an integer having a value of from about 8 to about 75, and $R_2$ is a trivalent alkylene radical, a filler, and an effective amount of a curing agent.

CARBOXY TERMINATED POLYMER AND CURED DERIVATIVE THEREOF

This application is a division of Ser. No. 241,058, filed Nov. 29, 1962.

This invention relates to novel curable polymeric adducts and solid propellants having as the binder such adducts.

In the preparation of propellant formulations it is desirable that the binder material be in the liquid state prior to the incorporation of the oxidizer and other additives into the binder. This makes for greatly increased ease of incorporation and handling as compared with binder materials which are rubbery prior to curing.

Previously it has been a problem in the propellant art to obtain a binder material which though liquid prior to curing, would cure to a rubbery elastomer at low temperatures, in the order of room temperature or below. For example, it has been proposed that a liquid polybutadiene containing two carboxyl terminal groups be used as the liquid binder material. However, this binder material must be cured at a temperature of around 130° to 150° F. These relatively high curing temperatures have several disadvantages. For example, many of the newer oxidizer materials such as hydrazine perchlorate are not stable for prolonged periods at these high curing temperatures. Thus, the propellants compounded from such oxidizers, using the known liquid binder materials, are not completely satisfactory. Further, the liquid binder materials previously known which are curable only at higher temperatures, possess other serious disadvantages. Thus, such high temperature curing materials tend to shrink upon cooling after the cure has been carried out. This shrinkage in the propellant sets up stresses which can produce cracks in the grain. These may result in motor failure during firing due to a sudden increase in the burning area when the faces of the cracks are exposed.

As additional problem in the propellant art has been to provide a firmly adherent liner material for the motor casing. Normally a highly filled propellant composition will not satisfactorily adhere to the metal rocket casing. For this reason, various liner materials have been proposed to form an adhesive bond between the casing and the propellant material. Previous liner materials have not been sufficiently adherent for this purpose, and thus have tended to pull away from the casing. Lining defects of this type can cause motor failure or unduly rapid burning due to the increased burning surface.

It is an object of this invention to prepare new liquid polymeric adducts which can be cured at room temperatures or below. It is another object of this invention to employ these liquid polymeric materials to obtain highly loaded propellant compositions. It is still another object of this invention to prepare solid propellant compositions from the novel liquid binder materials which are substantially free of internal stresses.

In still another aspect of this invention, it is an object to prepare a new cured polymer which will adhere to both a propellant grain and the motor casing, thus being useful as a motor liner. These and other objects of our invention will be apparent in the detailed description which follows.

It has now been found that certain new liquid carboxy-terminated polymer adducts are suitable as binders in castable propellant compositions. The propellant batches containing these liquid polymeric materials can be simply poured into forms and cured at room temperature or below to obtain a solid propellant which is substantially free of internal stresses at normal temperatures. The liquidity of the batch prior to curing greatly simplifies handling of the mass.

It has further been found that the new liquid carboxy-terminated polymers of this invention can be blended with large amounts of solids without the expenditure of large amounts of mechanical energy in the mixing process. These liquid polymers therefore permit of the addition of large amounts of solids in less time.

The new cured polymers have demonstrated a high degree of adherence to metals and solid propellant, and thus have been found to yield superior motor liners.

The new liquid carboxy-terminated polymeric adducts of this invention have the following generic formula:

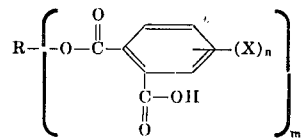

where X is a halogen selected from the group consisting of fluorine, chlorine, bromine and iodine, $n$ is an integer of from 1 to 4, and $m$ is an integer having the value 2 or 3. When $m$ in the above formula has a value of 2, R is a polymeric divalent organic radical selected from those having the formula:

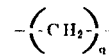

wherein $q$ is an integer having a value from about 60 to 600;

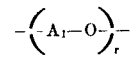

wherein $A_1$ is a straight or branched chained lower alkylene radical containing from one to about four carbon atoms, such as ethylene, propylene or butylene, and $r$ is an integer having a value of from about 20 to about 200; and

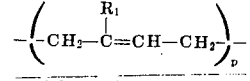

wherein $R_1$ is selected from the group consisting of hydrogen and methyl, and $p$ is an integer having a value of from about 12 to about 120. When $m$ is 3 in the above formula, R is a trivalent aliphatic organic radical of the formula:

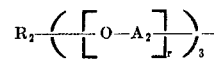

wherein $A_2$ is a lower alkylene radical, containing from one to about four carbon atoms, $r$ is an integer of from about 8 to about 75, and $R_2$ is a straight or branched chain trivalent alkylene radical having from three to about eight carbon atoms such as

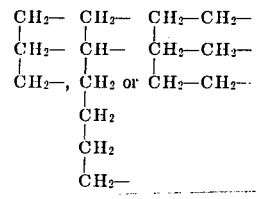

The novel liquid carboxy-terminated polymeric adducts of the above formula normally have a molecular weight of from about 1000 to about 10,000.

Our carboxy-terminated polymers are prepared by the reaction of an aliphatic polyol having the formula:

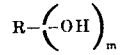

with 1 mole, for every hydroxy equivalent in said polyol, of an aromatic acid anhydride having the formula:

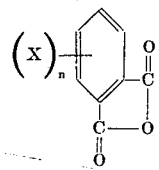

wherein R, X, $m$ and $n$ are as defined above.

The polyols employed in the preparation of the above-mentioned liquid polymers are diols such as polyethylene glycol, polyethylene ether glycol, polypropylene ether glycol, poly-1,2-butylene ether glycol, polytetramethylene ether glycol, polyisoprene glycol and polybutadiene glycol; and triols such as the adducts obtained by the reaction of alkylene oxides such as ethylene oxide, propylene oxide, butylene oxide, tetrahydrofuran and mixtures thereof, with aliphatic trihydroxy compounds such as glycerine, trimethylolpropane and 1,2,6-hexane triol.

Typical suitable acid anhydrides of the above formula are materials such as monochlorophthalic anhydride, monobromophtyalic anhydride, tetrafluorophthalic anhydride, chloroendic anhydride, and tetrachlorophthalic anhydride. It has been found that the use of the above-mentioned acid anhydrides are essential to the obtention of a liquid polymer which is curable at room temperature or below. Thus, if nonhalogenated acid anhydrides are employed, it has been found that the curing temperature rises to a level which is undesirable. Similarly, if an organic dibasic acid such as terephthalic acid or adipic acid is used in lieu of the above-mentioned anhydrides for reaction with the triols, the preparation of acid-terminated polymers is unsatisfactory because of the formation of highly viscous or gellike materials which are wholly unsuitable for the production of unsuitable propellants. Further, the use of such dibasic acids is also unsatisfactory with the foregoing diols because there results a product containing a multiplicity of materials of varying molecular weight. In fact, the product includes some unreacted dibasic acid which cannot be readily separated. This disparity in molecular weight of the various components in the product prevents the formation of a uniform and complete cure.

The preparation of the liquid polymers of the above formula is carried out at a temperature of from about 80° C. to about 150° C. Normally, the reaction is most conveniently carried out under atmospheric pressure. If desired, the reaction between the polyol and the acid anhydride may be assisted by the use of a small amount of a catalyst such as triethylene diamine. Optionally, the reaction may be carried out in the presence of an inert organic solvent such as benzene or toluene. In general, as has been pointed out above, the polyol and acid anhydride are employed in stoichiometric amounts, but other proportions may be used.

During the preparation of the liquid carboxy-terminated polymer, it is frequently desirable to agitate the medium so as to improve the contact between the reactants. The finished polymer is isolated in conventional manner by stripping, filtration and/or evaporation.

The examples which follow are for purpose of illustration only, and should not be regarded as limitative in any way. Except as otherwise indicated, percentages are by weight.

EXAMPLE I

Preparation of Liquid Carboxy-terminated Polymer

A typical preparation of the novel liquid carboxy-terminated polymer of this invention is as follows:

Into a three-necked 3-liter round bottom flask fitted with a stirrer, reflux condenser and thermometer, the following materials were charged:

0.30 moles of a triol having a molecular weight of about 4500 and prepared by reacting one mole of 1,2,6-hexane triol with about 90 moles of propylene oxide (this material may be obtained from the Union Carbide Chemical Company under the trade name LAT-42); 2.16 grams of triethylenediamine, and 300 grams of benzene. The mixture was heated with stirring at 115°-120° C. for 1 hour during which time refluxing benzene dehydrated the mixture by entraining water into a separatory funnel. After the mixture had cooled to 65° C., 0.90 moles of tetrachlorophthalic anhydride was added. The mixture was then again heated under reflux to 115°-120° C. for 2 hours. After cooling to ambient temperature, the benzene was removed and the solution was placed under vacuum of 2-5 ml. mercury. The solution was then heated to 115°-120° C. and maintained under vacuum for 1 hour. After filtering, a pale orange liquid carboxy-terminated polymer was obtained.

The above example was repeated using polybutadiene glycol instead of the triol. A liquid carboxy-terminated polymer was obtained.

When the foregoing procedure was repeated using monochlorophthalic anhydride in lieu of tetrachlorophthalic anhydride and polypropylene ether glycol in lieu of the above-mentioned triol, similar results were obtained.

EXAMPLE II

Following the procedure set forth in the preceding example, 1 mole of polytetramethylene ether glycol having a molecular weight of 3000 is reacted with 2 moles of tetrachlorophthalic anhydride in benzene solution. The reaction is carried out for about 1 hour at 100°-110° C. A liquid, carboxy-terminated polymeric adduct is obtained.

EXAMPLE III

One mole of polyethylene glycol, having a molecular weight of about 2000, [a compound wherein in the above formula R is $\pm(CH_2)_q$] is reacted with two moles of tetrabromophthalic anhydride in accordance with the procedure set forth in example I. A liquid, carboxy-terminated polymeric is obtained in good yield.

EXAMPLE IV

One mole of the reaction product of 1 mole of glycerin with 30 moles of propylene oxide is reacted with 3 moles of monofluorophthalic anhydride in toluene solution for 1-2 hours at 120° C. A fluorine-containing, carboxy-terminated adduct is obtained.

The novel liquid carboxy-terminated polymers of this invention can be cured, in the absence or pressure of fillers or other additaments, to tough elastomers at room temperature or below by aziridinyl curing agents.

These aziridinyl curing agents may be, for example, of the following formulas:

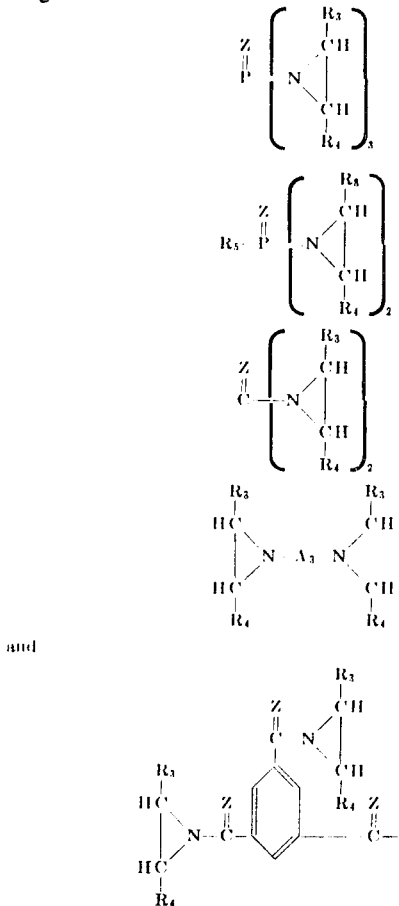

wherein in the above formulas, Z is oxygen or sulfur, $R_3$ and $R_4$ are hydrogen or lower alkyl, $R_5$ is lower alkyl or phenyl, and $A_3$ is an alkylene radical of from one to about 20 carbon atoms. The lower alkyl groups contain from one to about four carbon atoms and include methyl, ethyl, propyl and butyl. Illustrative of such compounds are tris(methyl aziridinyl)phosphine oxide, bis(methyl azimdinyl)phenylphosphine oxide, N,N,N',N'-diethyleneurea, N,N,N',N'-diethylenethiourea, 1,4-bis-(-1-aziridinyl)butane, 1,10-bis-(-1-aziridinyl)decane, N,N,N',N',N'',N''-triethylene trimesicamide, and tris(aziridinyl)phosphine sulfide. Other curing agents can be used where the low curing temperature is less critical, as in the forming of motor liners. For example, the liquid polymers of this invention can be cured at 100° F.–110° F. by epoxy curing agents such as 3,4-epoxy-6-methylcyclohexylmethyl-3,4-epoxy-6-methyl cyclohexane carboxylate, the reaction product of 3 moles of epichlorohydrin with 1 mole of para aminophenol, or epoxidized polybutadiene having a molecular weight within the range from about 800 to about 9000. Even at 100°–110° F., the cure temperature of our polymers with epoxies is far below the 180° F. temperature used to epoxy-cure previously known carboxy-terminated polybutadienes.

EXAMPLE V

Cure of Liquid Polymer

When 1.8 grams of tris-(methyl aziridinyl)phosphine oxide and 40 grams of mica are blended with 38.2 grams of the liquid carboxy-terminated polymer, prepared in example II, and maintained at room temperature for several hours, a tough cured rubber is obtained.

The cured rubber has a wide variety of uses. Thus, rubbers of this type find application in electrical wire insulation, tank linings, cements, hoses and belting.

The novel liquid carboxy-terminated polymers, containing a curing agent and other additives, can be cured to a solid product at room temperature or below, or at higher temperatures, if desired. Normally, curing is carried out at a temperature of from about 40° F. to about 80° F. It is to be understood that curing can be carried out at higher temperatures although such is not necessary and, as has been pointed out above, is sometimes undesirable.

Propellants may be prepared from our novel liquid polymers by the interblending of an oxidizer and the curing agent, followed by curing. A wide variety of solid oxidizers may be combined with our polymers. Typical of suitable inorganic oxidizers are the alkali metal and alkaline earth metal perchlorates, chlorates, nitrates, chromates, dichromates and permanganates. Illustrative of such oxidizers are lithium perchlorate, potassium perchlorate, calcium perchlorate, potassium chlorate, calcium chlorate, potassium chromate, potassium dichromate, potassium nitrate, lithium nitrate, potassium permanganate and calcium nitrate. Likewise, ammonium salts of the above-mentioned anions can be used such as ammonium perchlorate, ammonium nitrate, ammonium dichromate and ammonium permanganate. Still another suitable inorganic oxidizer is hydrazine perchlorate. Illustrative of the organic oxidizers suitable in the practice of this invention are cellulose nitrate and guanidine nitrate.

In general the propellant compositions of our invention comprise:

| | |
|---|---|
| liquid polymer | about 5 to about 40 parts by weight per 100 parts of total propellant composition, |
| oxidizer | about 40 to about 90 parts by weight per 100 parts of total propellant composition, |
| curing agent | an effective amount in the order of about 0.5 to about 20 parts by weight per 100 parts of total propellant composition, | with any desired additional ingredients being present in the balance of the composition which can include combustion additives, fillers, stabilizers, plasticizers, etc.

More preferably, the propellant composition comprises:

| | |
|---|---|
| liquid polymer | about 5 to about 20 parts by weight per 100 parts of total propellant composition, |
| oxidizer | about 65 to about 72 parts by weight per 100 parts of total propellant composition, |
| curing agent | about 0.5 to about 10 parts by weight per 100 parts of total propellant composition. |

Combustion additives such as the powdered metals, i.e., powdered aluminum, powdered beryllium, etc., may also be added to the propellant compositions of this invention. The preferred powdered metals are those having an average particle size of 25–28 microns. These powdered metal combustion additives serve to increase the specific impulse of the resulting propellant. These combustion additives are generally advantageously employed in an amount of from about 25 to about 200 parts by weight for each 100 parts of the liquid polymer used in the formulation. Preferred of our propellants are those in which the amount of oxidizer plus combustion additive constitutes about 75 to about 90 percent by weight of the total propellant composition with the propellant having an oxygen balance of about zero to about –60, calculated on the basis of total conversion of the carbon, hydrogen and metal in the propellant to carbon dioxide, water and metal oxide, respectively.

The propellant compositions of this invention may contain optionally, in addition to the above-mentioned ingredients, other additaments such as wetting agents, stabilizers, fillers, plasticizers, and processing aids.

Thus, there may be added to the propellant composition prior to curing from about five to about 50 parts by weight of a plasticizer per 100 parts of liquid polymer. Typical plasticizers are materials such as hydrocarbon oils, fluorinated plasticizers, waxes, asphalts, higher aliphatic and aromatic esters and resins such as hydrogenated ester gums. Preferred plasticizers are isodecyl pelargonate and the nitroplasticizers disclosed in assignee's copending U.S. Pat. application, Ser. No. 2072, filed Jan. 12, 1960, now abandoned.

The propellant interblending procedure to be followed in the practice of our invention is as follows: a liquid polymer, as defined above, is added to an internal mixer and is degassed. Then the wetting agents, stabilizers, fillers, processing aids, plasticizers and combustion additives are added to the polymer and mixed for a period of time necessary for their incorporation into the polymer. The oxidizer, or oxidizers, are then added in increments and mixed under vacuum. After all the oxidizer has been incorporated, the curative is added and mixed under vacuum until it is incorporated. The mixture is then cast, preferably under vacuum, from the mixer into containers. Many modifications of this procedure are possible. Thus, the liquid polymer and the plasticizer may be added simultaneously to the mixer.

The mixer which we have found to be particularly effective for interblending our propellant ingredients is that known commercially as the P mixer. The P mixer is manufactured by Baker-Perkins, Inc., of Saginaw, Mich., and it can be equipped with facilities for heating, cooling, and vacuumizing propellant batches during mixing.

EXAMPLE VI

To a mixer which was maintained at about 70° F. was added 9.1 parts of a liquid carboxy-terminated polymer prepared from a polytetramethylene ether glycol having a molecular weight of about 3000 and tetrachlorophthalic anhydride in accordance with the procedure set forth in example II. Then 10 parts of bis-(2,2-dinitropropyl) formal and 20 parts of aluminum powder having an average particle size of 25 to 28 microns were added. These ingredients mixed until the aluminum was completely wetted down. The mixture was then degassed under vacuum for about 10 minutes, then 60 parts of ammonium perchlorate was added and mixing continued for about 20 minutes. Then 0.9 parts of tris(methylaziridinyl)phosphine oxide was added as a curing agent and mixing continued for an additional 5 minutes. During this time the temperature was maintained at about 70° F. The mixture was then cast and cured at 80° F. for 16 hours. The resultant product was rubbery.

When the above example was repeated, using hydrazine perchlorate in lieu of the ammonium perchlorate, as the oxidizer, a satisfactory rubbery polymer was again obtained after curing for 16 hours at 80° F.

EXAMPLE VII

Following the procedure set forth in example VI, a propellant was prepared from the following ingredients:

| Ingredient | Weight Percent |
| --- | --- |
| Carboxy-terminated polymer from polytetramethylene ether glycol having a molecular weight of about 3,000 and tetrachlorophthalic anhydride. | 15.75 |
| Tris(methylaziridinyl)phosphine oxide | 0.88 |
| Bix-(2,2-dinitropropyl)acetal | 8.37 |
| Aluminum | 18.75 |
| Hydrazine perchlorate | 56.25 |
| Total | 100.00 |

A resilient polymer was achieved after curing for 16 hours at 80° F.

The motor liner compositions of this invention normally contain the following ingredients in the percentages indicated:

| | |
| --- | --- |
| liquid polymer | about 5 to about 90 parts by weight per 100 parts of total liner composition, |
| curing agent | an effective amount in the order of about 0.5 to about 20 parts by weight per 100 parts of total liner composition, |
| fillers | 0 to about 60 parts by weight per 100 parts of total liner composition. |

In addition, this liner composition may contain plasticizers, stabilizers and other additives well-known in the rubber art. Preferred fillers are materials such as titanium dioxide and mica.

The following examples illustrate the use of the polymers of this invention in a motor liner material.

EXAMPLE VIII

A sandblasted steel motor casing was coated with a liquid composition consisting of 80 parts by weight of a carboxy-terminated polymer (prepared in accordance with the process described above by reacting 1 mole of a 1,2,6-hexane triol-propylene oxide adduct having a molecular weight of 4500 with 3 moles of chlorendic anhydride); 10 parts of 3,4-epoxy-6-methylcyclohexyl methyl-3,4-epoxy-6-methylcyclohexane carboxylate and 10 parts of titanium dioxide. The coated casing was cured for 3 days at 110° F. The coated casing was then filled with a polyurethane propellant prepared in accordance with assignee's copending U.S. application, Ser. No. 33,054, filed May 31, 1960; from 65 parts ammonium perchlorate, 17 parts powdered aluminum, 2 parts polytetramethylene ether glycol, 3.2 parts neopentyl glycol azelate, 6.2 parts polypropylene ether glycol, 0.055 parts triethanol amine, 4.24 parts isodecyl pelargonate, 0.1 parts carbon black, 0.1 parts sulfur, 0.35 parts copper chromite, one part toluene diisocyanate, 0.10 parts lecithin and 0.06 parts ferric acetylacetonate. The propellant was then cured for 3 days at 150° F. The coating was found to adhere tenaciously to both the casing and the propellant.

The following coatings were also found to have good adherence to both the propellant and the casing.

EXAMPLE IX

| Ingredient | Weight Percent |
| --- | --- |
| Polytetramethylene ether diol-tetrachlorophthalic anhydride adduct (prepared according to Example II) | 85.97 |
| Tris(methylaziridinyl)phosphine oxide | 3.98 |
| Titanium dioxide | 10.00 |
| Phenylbetanaphthylamine | 0.05 |

EXAMPLE X

| Ingredient | Weight Percent |
| --- | --- |
| Polytetramethylene ether diol-tetrachlorophthalic anhydride adduct (prepared according to Example II) | 81.18 |
| Reaction product of 3 moles epichlorohydrin and one mole para aminophenol | 8.82 |
| Titanium dioxide | 10.00 |

EXAMPLE XI

| Ingredient | Weight Percent |
| --- | --- |
| Polypropylene ether glycol-tetrachlorophthalic anhydride adduct (prepared according to Example I) | 81.54 |
| Epoxidized polybutadiene MW ~2000 | 8.46 |
| Titanium dioxide | 10.00 |

It will be understood that various modifications may be made in this invention without departing from the spirit thereof or the scope of the appended claims.

We claim:

1. A liquid carboxy-terminated polymeric adduct having the formula

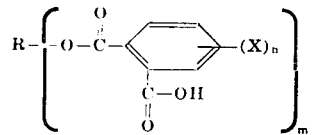

wherein X is a halogen, $n$ is an integer of from 1 to 4, $m$ is an integer of from 2 to 3; wherein in the above formula when $m$ has a value of 2, R is a polymeric divalent organic radical selected from those having the formula

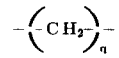

wherein $q$ is an integer having a value from about 60 to about 600,

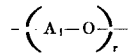

wherein $A_1$ is a lower alkylene radical and $r$ is an integer having a value from about 20 to about 200, and

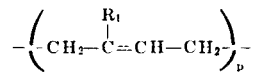

wherein $R_1$ is selected from the group consisting of hydrogen and methyl and $p$ is an integer having a value of from about 12 to about 120; and wherein when $m$ is 3, R is a trivalent radical of the formula

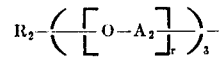

Wherein $A_2$ is a lower alkylene radical, $r$ is an integer having a value of from about 8 to about 75, and $R_2$ is a trivalent alkylene radical.

2. A new liquid carboxy-terminated polymeric adduct having the formula

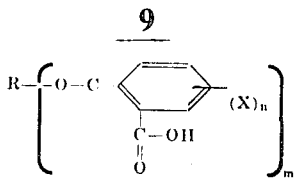

wherein X is halogen, n is an integer of from 1 to 4, and R is a polymeric divalent organic radical selected from the group consisting of

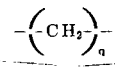

wherein $q$ is an integer having a value from about 60 to about 600,

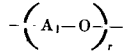

wherein $A_1$ is a lower alkylene radical and $r$ is an integer having a value from about 20 to about 200, and

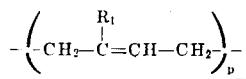

wherein $R_1$ is selected from the group consisting of hydrogen and methyl and $p$ is an integer having a value from about 12 to about 120.

3. A liquid carboxy-terminated polymeric adduct having the general formula

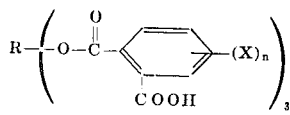

wherein R is a trivalent organic radical of the formula

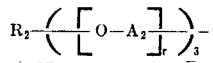

wherein $R_2$ is a trivalent alkylene radical, $A_2$ is a lower alkylene radical and $r$ is an integer having a value of from about 8 to about 75.

4. The method of preparing liquid carboxy-terminated polymeric adducts which comprises reacting an aromatic acid anhydride having the formula

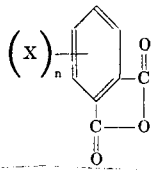

wherein X is halogen and $n$ is an integer of from 1 to 4, with a polymeric aliphatic polyol having the formula

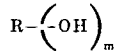

wherein $m$ is an integer having a value from 2 to 3; wherein when $m$ has a value of 2, R is a polymeric divalent organic radical selected from the group consisting of

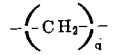

wherein $q$ is an integer having a value from about 60 to 600;

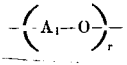

wherein $A_1$ is a lower alkylene radical, and $r$ is an integer having a value from about 20 to about 200, and

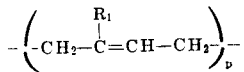

wherein $R_1$ is selected from the group consisting of hydrogen and methyl, and $p$ is an integer having a value from about 12 to about 120; and when $m$ is 3, R is a trivalent organic radical of the formula

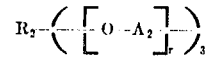

Wherein $A_2$ is a lower alkylene radical, $r$ is an integer having a value of from about 8 to 75, and $R_2$ is a trivalent alkylene radical.

5. A cured rubber composition comprising the reaction product of a liquid carboxy-terminated polymeric adduct having the generic formula

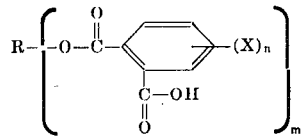

wherein X is a halogen, n is an integer of from 1 to 4, $m$ is an integer of from 2 to 3; wherein when $m$ has a value of 2, R is a polymeric divalent organic radical selected from those having the formula

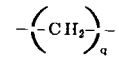

wherein $q$ is an integer having a value from about 60 to about 600,

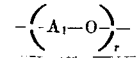

wherein $A_1$ is a lower alkylene radical and $r$ is an integer having a value from 20 to about 200; and

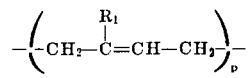

wherein $R_1$ is selected from the group consisting of hydrogen and methyl and $p$ is an integer having a value of from about 12 to about 120; and wherein when $m$ is 3, R is a trivalent radical of the formula

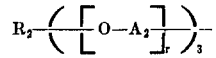

wherein $A_2$ is a lower alkylene radical, $r$ is an integer having a value of from about 8 to about 75, and $R_2$ is a trivalent alkylene radical, a filler, and an effective amount of a curing agent.

6. A cured rubber composition comprising the reaction product of a liquid carboxy-terminated polymeric adduct having the generic formula

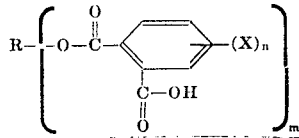

wherein X is a halogen, n is an integer of from 1 to 4, $m$ is an integer of from 2 to 3; wherein when $m$ has a value of 2, R is a polymeric divalent organic radical selected from those having the formula

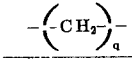

wherein $q$ is an integer having a value from 60 to about 600,

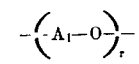

wherein $A_1$ is a lower alkylene radical and $r$ is an integer having a value from about 20 to about 200, and

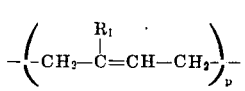

wherein $R_1$ is selected from the group consisting of hydrogen and methyl and $p$ is an integer having a value of from about 12 to about 120; and wherein $m$ is 3, R is a trivalent radical of the formula

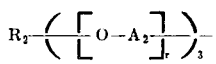

wherein $A_2$ is a lower alkylene radical, $r$ is an integer having a value of from about 8 to about 75, and $R_2$ is a trivalent alkylene radical, a filler, and 0.5 to 20 parts of a curing agent for each 100 parts of said rubber composition.

7. The method of preparing a cured rubber composition comprising interblending a liquid carboxy-terminated polymeric adduct having the formula

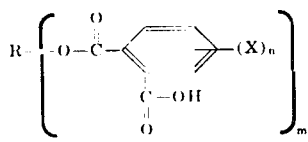

wherein X is a halogen, $n$ is an integer of from 1 to 4, $m$ is an integer of from 2 to 3; wherein when $m$ has a value of 2, R is a polymeric divalent organic radical selected from those having the formula

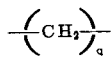

wherein $q$ is an integer having a value from about 60 to about 600,

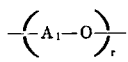

wherein $A_1$ is a lower alkylene radical and $r$ is an integer having a value from about 20 to about 200, and

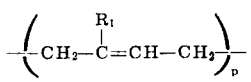

wherein $R_1$ is selected from the group consisting of hydrogen and methyl and $p$ is an integer having a value of from about 12 to about 120; and wherein when $m$ is 3, R is a trivalent radical of the formula

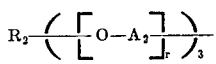

wherein $A_2$ is a lower alkylene radical, $r$ is an integer having a value of from about 8 to about 75, and $R_2$ is a trivalent alkylene radical, a filler, and an effective amount of a curing agent, and permitting the interblended mixture to cure.

8. The method of claim 7 wherein the curing is effected at room temperature.

9. The method of preparing a cured rubber composition comprising interblending about five to about 40 parts by weight per 100 parts of the rubber composition of a liquid carboxy-terminated polymeric adduct having the formula

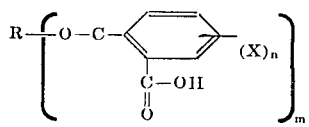

wherein X is a halogen, $n$ is an integer of from 1 to 4, $m$ is an integer of from 2 to 3; wherein when $m$ has a value of 2, R is a polymeric divalent organic radical selected from those having the formula

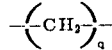

wherein $q$ is an integer having a value from about 60 to about 600,

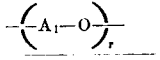

wherein $A_1$ is a lower alkylene radical and $r$ is an integer having a value from about 20 to about 200, and

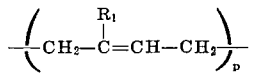

wherein $R_1$ is selected from the group consisting of hydrogen and methyl and $p$ is an integer having a value of from about 12 to about 120; and wherein when $m$ is 3, R is a trivalent radical of the formula

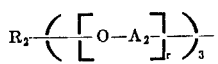

wherein $A_2$ is a lower alkylene radical, $r$ is an integer having a value of from about 8 to about 75, and $R_2$ is a trivalent alkylene radical, a filler, and about 0.5 to about 20 parts of a curing agent per 100 parts of the rubber composition, and permitting the interblended mixture to cure.

10. The method of claim 9 wherein the curing is carried out at room temperature.

* * * * *